(12) United States Patent
Collins et al.

(10) Patent No.: US 6,466,126 B2
(45) Date of Patent: Oct. 15, 2002

(54) PORTABLE DATA DEVICE EFFICIENTLY UTILIZING ITS AVAILABLE POWER AND METHOD THEREOF

(75) Inventors: Timothy James Collins, Lockport, IL (US); Patrick Lee Rakers, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/765,684

(22) Filed: Jan. 19, 2001

(65) Prior Publication Data

US 2002/0097144 A1 Jul. 25, 2002

(51) Int. Cl.[7] ................................................. G08B 1/00
(52) U.S. Cl. ................. 340/333; 340/572.1; 340/572.7; 340/635; 340/636; 340/825.53
(58) Field of Search ............... 340/572, 572.1, 340/572.7, 635, 636, 646, 333, 310, 825.53, 10.1, 10.52

(56) References Cited

U.S. PATENT DOCUMENTS

| 4,924,075 | A | * | 5/1990 | Tanaka ........................ 235/380 |
| 5,287,286 | A | * | 2/1994 | Ninomiya .................... 340/636 |
| 5,302,954 | A | | 4/1994 | Brooks et al. |
| 5,363,425 | A | * | 11/1994 | Mufti et al. ............ 340/825.49 |
| 5,497,140 | A | * | 3/1996 | Tuttle ..................... 340/825.32 |
| 5,517,194 | A | * | 5/1996 | Carroll et al. ......... 340/825.54 |
| 5,680,106 | A | | 10/1997 | Schrott et al. |
| 5,684,404 | A | * | 11/1997 | Millar ........................ 340/636 |
| 5,745,037 | A | * | 4/1998 | Guthrie et al. .............. 340/573 |

* cited by examiner

Primary Examiner—Daniel J. Wu
Assistant Examiner—Hung Nguyen
(74) Attorney, Agent, or Firm—Terri S. Hughes

(57) ABSTRACT

A portable data device (400) having a power controller (430), a clock generator (428) and a digital circuit (432). The power controller (430) has an output signal. The output signal is representative of available power. The clock generator (428) is coupled to the output signal of the power controller (430) for generating a variable clock rate corresponding to the output signal. The digital circuit (432) is coupled to the clock generator (428), and the digital circuit (432) is controlled by the variable clock rate.

19 Claims, 9 Drawing Sheets

PORTABLE DATA DEVICE EFFICIENTLY UTILIZING ITS AVAILABLE POWER AND METHOD THEREOF

FIELD OF THE INVENTION

The present invention relates generally to a portable data device efficiently utilizing its available power and method thereof, and in particular, to a portable data device efficiently utilizing its available power by adjusting its clock rate.

BACKGROUND OF THE INVENTION

Credit cards, typically provided with magnetic stripes, have been around for many years. These types of credit cards, however, have a design flaw. The mechanical interface between the credit card and the reader requires periodic cleaning. The poor reliability of the readers, due to the mechanical interface, causes down time for reader maintenance. Contactless smart cards have been developed which eliminate the mechanical interface between the card and the reader.

Standards are currently being created around the contactless smart card. The most widely accepted standard is the ISO-14443, which specifies the nature and characteristics of the fields to be provided for power and bi-directional communications between a portable data device (e.g., smart card) and an interface device (e.g., a reader). The system requires the presence of both the reader and the smart card. Together, the reader and the smart card comprise a loosely coupled transformer. A sinusoidal waveform, which is also the radio frequency ("RF") carrier, is injected onto the reader coil (antenna) and is used to create a magnetic field. When the smart card is placed in the field, the energy that passes through a loop antenna residing on the smart card is received by an integrated circuit ("IC") also residing on the smart card. The power for the smart card is extracted from the magnetic field. By changing the intensity of the magnetic field as a function of time, data can also be transferred between the smart card and the reader.

FIG. 1 illustrates a block diagram of a contactless smart card system having a reader 100 and a smart card 110. The reader 100 comprises a signal source 102 and a resonant output circuit, which comprises capacitors 104 and 106 and an inductive antenna 108. The resonant frequency of the resonant output circuit 104, 106, 108 is substantially equal to the frequency of signal source 102. The inductive antenna 108 generates an electromagnetic field when a signal is applied to it.

The smart card 110 comprises an integrated circuit 114 and an inductive loop 112. When the smart card 110 is brought into the proximity of the reader 100, the inductive antenna 108 of the reader 100 and the inductive loop 112 of the smart card 110 form a loosely coupled transformer. A coupling coefficient M 115 for the loosely coupled transformer is a function of distance and orientation of the inductive antenna 108 and the inductive loop 112. The electromagnetic field generated by the inductive antenna 108 is received by the inductive loop 112 and converted to a current. This received current can be used to power the integrated circuit 114. The electromagnetic field can also be used for data transfer between the reader 100 and the smart card 110.

The integrated circuit 114 can consist of several different components. A digital circuit 116 provides the "brains" and functionality for the smart card 110. The other components contained within the integrated circuit 114 support the functionality of the digital circuit 116.

The inductive loop 112 and a tuning capacitor 118 constitute a resonant tank. This resonant tank is tuned to the signal frequency of the signal source 102 of the reader 100. The resonant tank facilitates efficient power coupling of the received field to the integrated circuit 114.

A power rectifier 120 rectifies the alternating current ("AC") signal received on the inductive loop 112 creating a signal with direct current ("DC") content. The power rectifier 120 essentially performs an AC-to DC transformation. A power controller 12 operates on this DC signal and creates the required power supply signals required to power the digital circuit 116.

A receiver 124 performs data detection and reconstruction. The receiver 124 detects and reconstructs the digital bit stream of any signal transmitted by the reader 100 to the smart card 110. The receiver 124 supplies input data for the digital circuit 116. A transmitter 126 creates a modulated signal for transmission via the electromagnetic field from the smart card 110 to the reader 100. The transmitter 126 provides the output data path for the digital circuit 116.

A timing reference is created by a clock generator 128, which creates a clock signal from the received signal. The clock generator 128 provides the timing reference for the digital circuit 116.

FIG. 2 illustrates how the power level at the smart card 110 changes as the distance between the reader 100 and the smart card 110 varies for the smart card system shown in FIG. 1. Curve 201 shows the power available to the smart card 110 for varying distances between the inductive antenna 108 and the inductive loop 112. As can be seen as the smart card 110 moves closer to the reader 100, the power received is greater than what is available at further distances. As the distance between the inductive antenna 108 of the reader 100 and the inductive loop 112 of the smart card 110 increases, the power available to the digital circuit 116 decreases. Due to integrated circuit requirements, the excess power received at close coupling between the smart card 110 and reader 100 should be consumed. Currently, the excess power is wasted by dumping it to ground. To allow operation of the smart card 110 over a range of distances, the power levels are set so the operating power of the smart card 110 is obtained at the desired maximum distance between the reader 100 and the smart card 110. Since there is no feedback between the smart card 110 and the reader 100, the power level cannot be adjusted during a transaction.

As the complexity of the smart card system increases, so will the power required by the smart card 110 to support the increased card capabilities. Due to emission standards, which support the smart card system of FIG. 1, the amount of power delivered by the reader to the smart card 110 cannot be increased. So as can be expected, the operating range of the smart card 110 is reduced when additional system features/requirements are added to the smart card 110. This reduction in operating range degrades system performance.

Further, it is generally accepted by the smart card industry that the transaction times must be less than 100 milliseconds. The overall transaction time is a function of the time required to transfer information between the reader 100 and the smart card 110. As can be expected, additional features increase the time required to complete a transaction. ISO specifications dictate the nature and characteristics of the carrier frequency to be provided for power between the reader 100 and the smart card 110. Since the frequency delivered to the smart card 110 is dictated by the ISO standards, and the clock rate is derived from the frequency, the number of clock cycles during a given time period is a constant. Additional commands, however, require more clock cycles, thus increasing transaction time.

Moreover, for prior art smart card designs, such as that shown in FIG. 1, there is a fixed amount of useful power dissipation. The integrated circuit 114 operates using a constant clock frequency independent of the distance between the reader 100 and the smart card 110. Since power dissipation in a digital complementary metal oxide semiconductor ("CMOS") circuit is directly proportional to the clock frequency, the amount of power dissipated by the CMOS digital circuit with a fixed clock frequency will also be fixed. If this fixed power dissipation requirement is met by the received power available in the RF field, then the smart card 110 will operate as desired. If the fixed power dissipation requirement is not met by the received power in the RF field, the smart card 110 will not function.

FIG. 3 illustrates a plot of current versus distance for the smart card system shown in FIG. 1. Curve 303 shows the current available from the RF field. Curve 305 shows useful current dissipation versus distance. Note that curve 305 is a fixed constant value for distances where more power is available than is required. When the current available from the RF field, as represented by curve 303, drops below the fixed power requirement for the smart card 110, the useful power dissipation drops to zero, as the smart card 110 is no longer functional or useful. The difference between the curves 303 and 305 represents wasted excess power that provides no functional benefit. This is power, however, that should be dissipated by the smart card 110.

Thus, there exists a need for a circuit that will allow additional power consuming features to be added to a smart card, without increasing the power delivered to the smart card. Additionally, there exists a need for a circuit that will allow faster transaction times without increasing the frequency delivered to the smart card from the reader.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

Figure 4A:
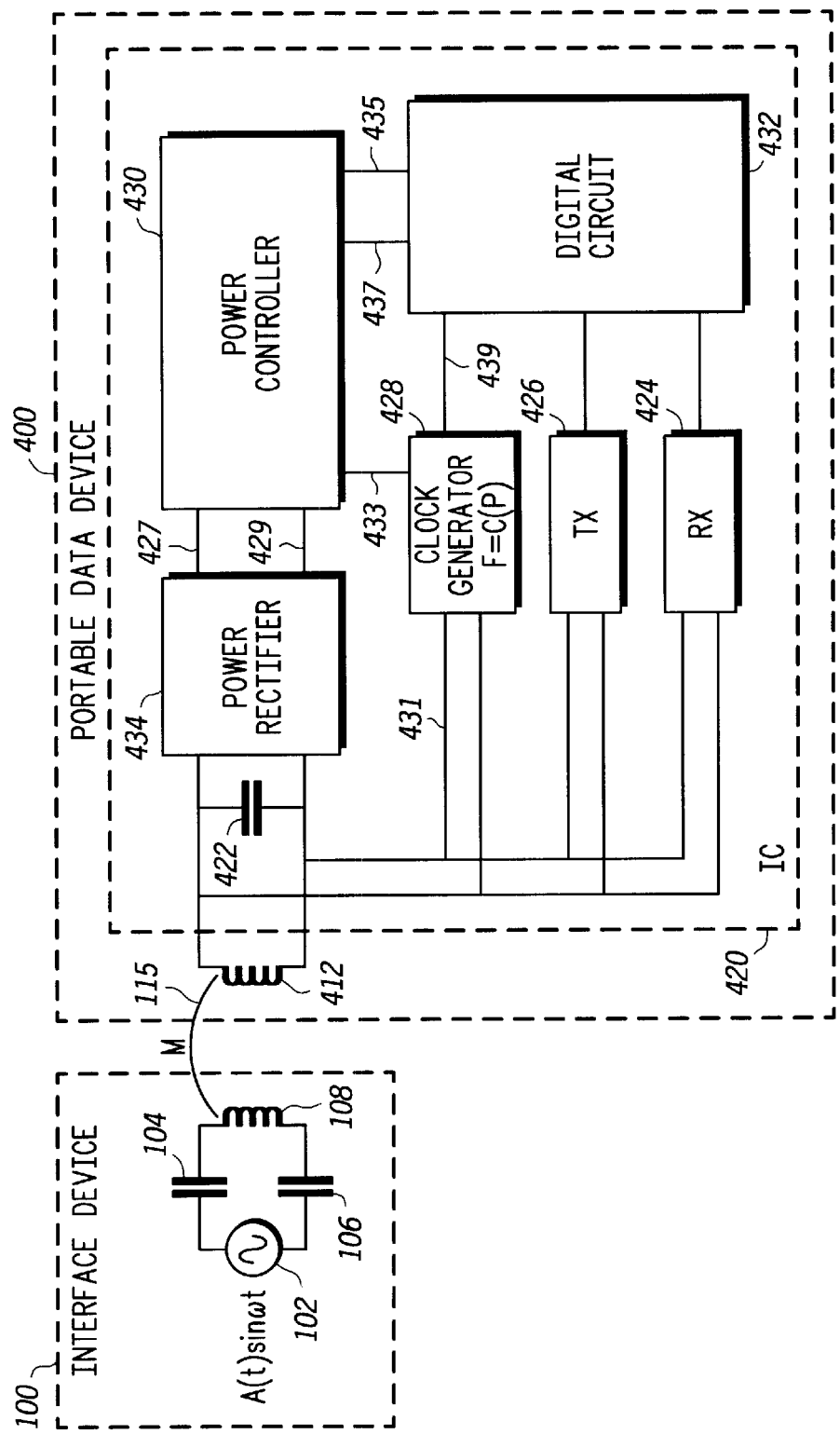
FIG. 4a illustrates a general block diagram of a smart card system in accordance with the preferred embodiment of the present invention.
Figure 4B:
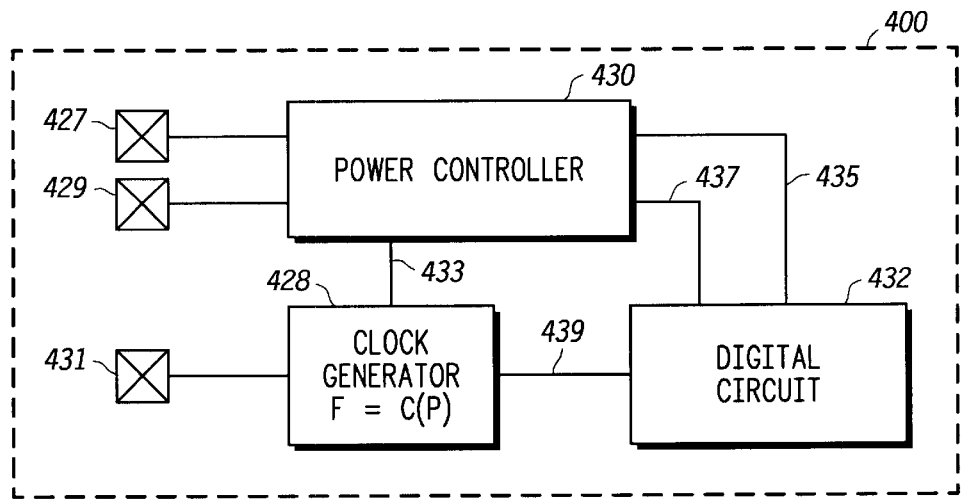
FIG. 4b illustrates an exploded view of the coupling between components residing on a portable data device in accordance with the preferred embodiment of the present invention.

In accordance with the preferred embodiment of the present invention, FIG. 4a illustrates a general block diagram of a portable data device (e.g., a smart card) 400 that utilizes its available power in a more efficient manner than that of the prior art design. FIG. 4b illustrates an exploded view of the coupling between the digital circuit 432, the clock generator 428, and the power controller 430 of the portable data device of FIG. 4a. The digital circuit 432 provides the signal processing or computation requirements of the device 400. The digital circuit 432 could be, but not limited to, a microprocessor, a micro-controller, a digital signal processor, or custom digital hardware. A power controller 430 couples a power signal from input power ports 427 and 429 to power ports 435 and 437 on the digital circuit 432. The power controller 430 also provides a measure of the available power at signal 433. A clock generator 428 generates a clock signal 439 used by the digital circuit 432. The clock generator 428 uses the measured available power signal 433 from the power controller 430 to adjust the frequency of the clock signal 439 for the digital circuit 432. FIG. 4a includes a reference clock input 431 for generation of the clock signal 439 for the digital circuit 432. The clock generator 428 may or may not require a reference clock frequency input.

Figure 1:
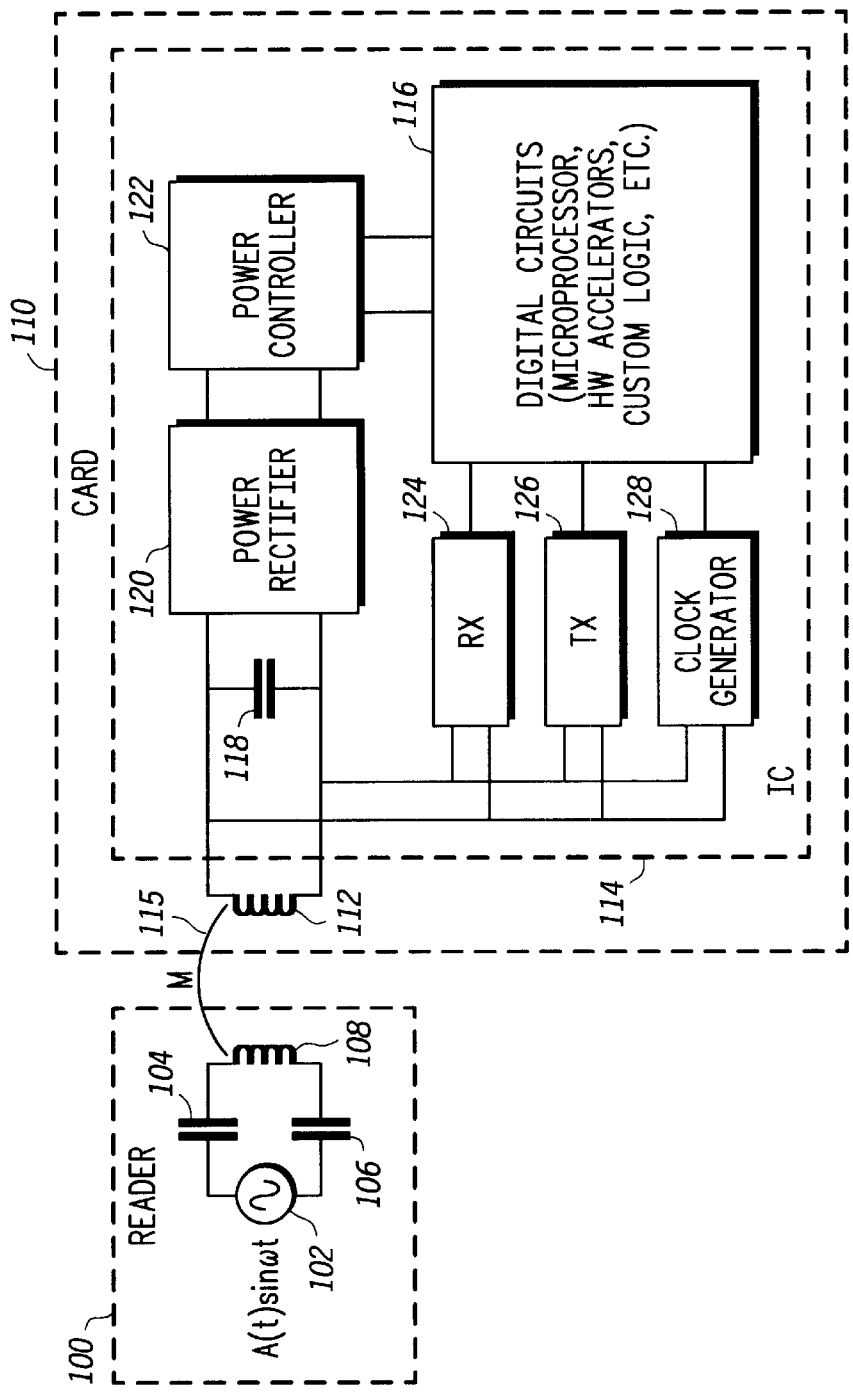
FIG. 1 (prior art) illustrates a block diagram of a smart card system.
Figure 2:
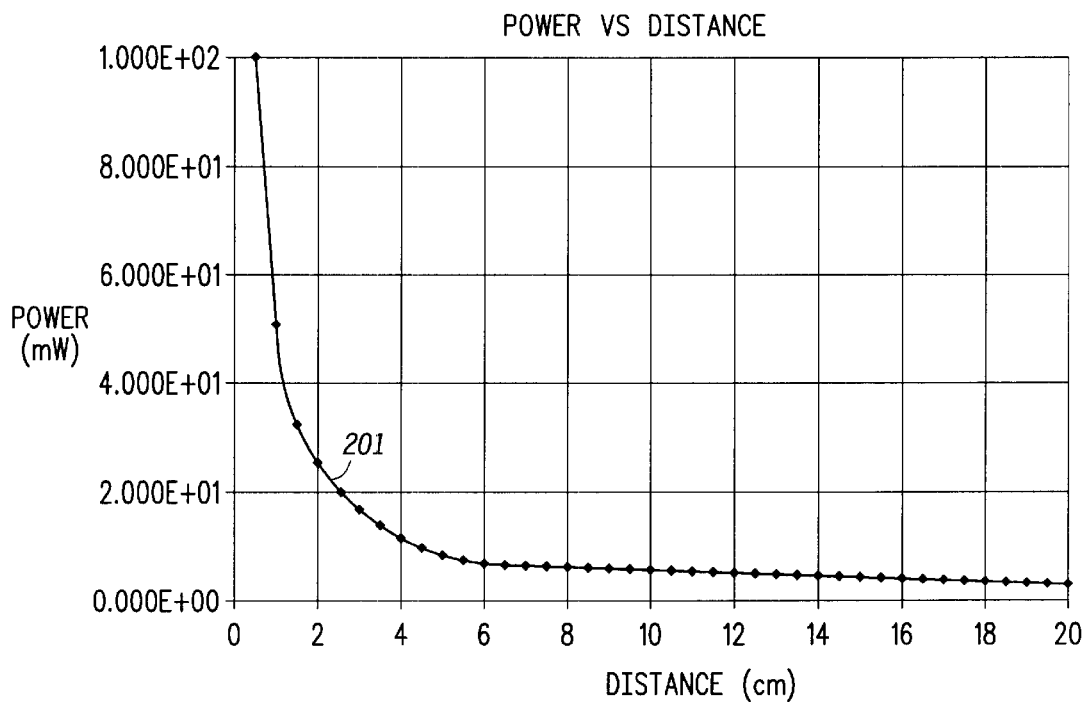
FIG. 2 (prior art) illustrates a plot of a reader's available power versus distance for the smart card system of FIG. 1.
Figure 3:
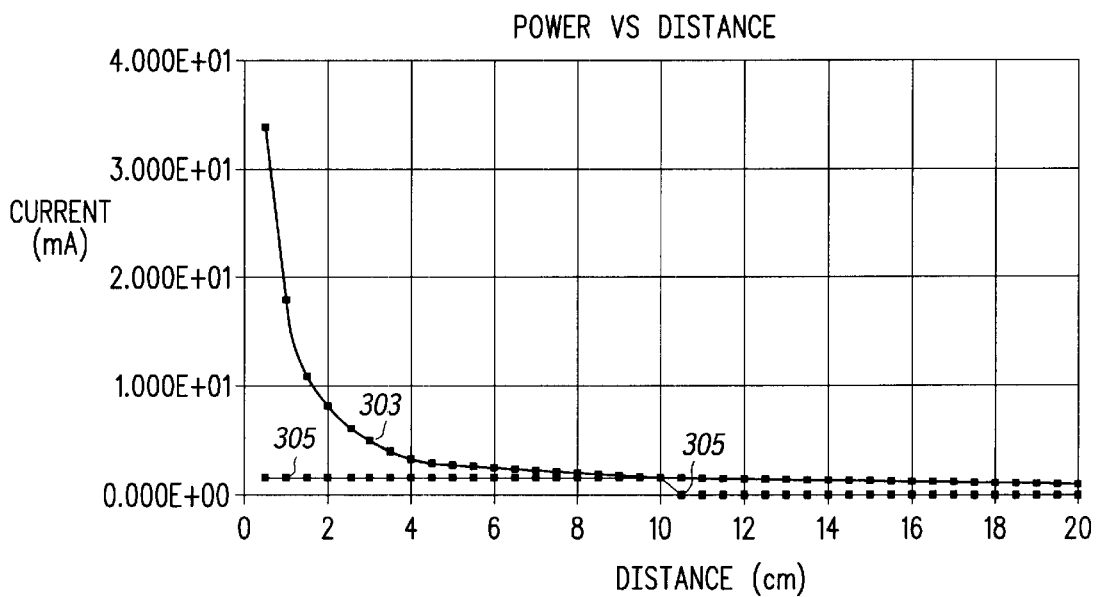
FIG. 3 (prior art) illustrates a plot of current versus distance for the smart card system of FIG. 1.

The clock generator 428 can vary the frequency of the clock signal 439 as a function of the available power represented by the signal 433. In accordance with the preferred embodiment of the present invention, when excess power is available (i.e., when there is close coupling between the portable data device 400 and the interface device 100), the clock frequency is increased. If less power is available (i.e., when the portable data device 400 is further away from the interface device 100), the clock frequency is reduced. One advantage of the present invention is that when excess power is available, the digital processing can be completed faster. Another advantage of the present invention is that when sufficient power is not available from the RF field, processing can continue at a reduced rate. The prior art solution exemplified by smart card 110 in FIG. 1 has a fixed transaction time in its powering range and is non-functional beyond that range (e.g., 10 cm—see FIG. 3).

Figure 5:
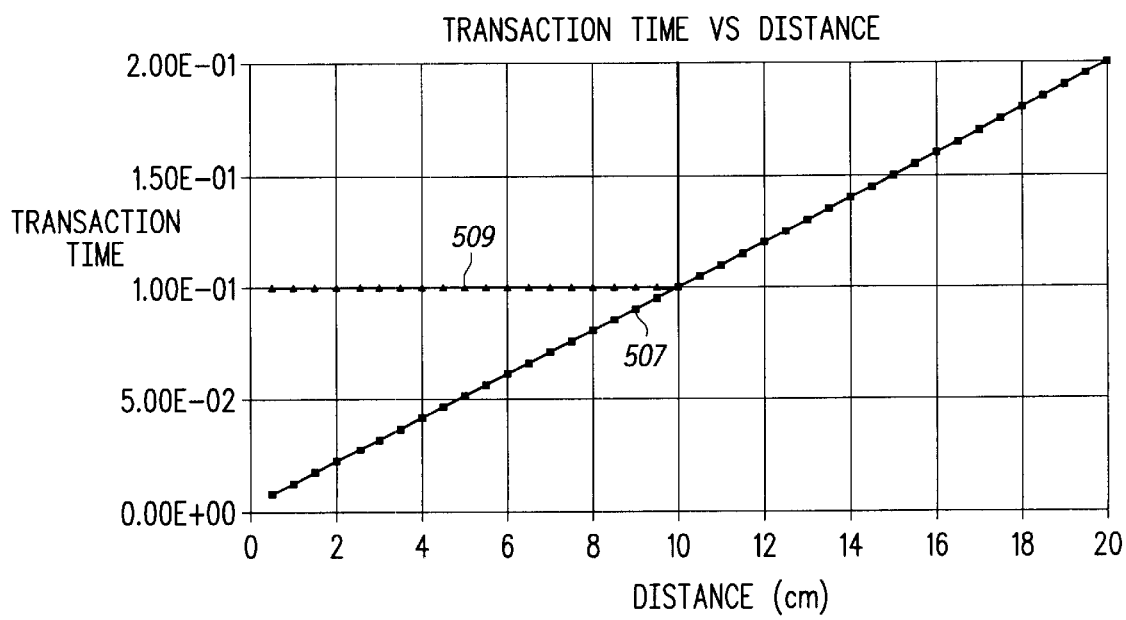
FIG. 5 illustrates a plot of transaction time versus distance in accordance with the preferred embodiment of the present invention.

FIG. 5 illustrates a plot of transaction time versus distance in accordance with the preferred embodiment of the present invention. Curve 507 is the transaction time versus distance curve for the integrated circuit 420 of FIG. 4a. Curve 509 is the transaction time versus distance curve for the prior art solution exemplified by the integrated circuit of FIG. 1. When the distance between the reader 100 and portable data device 400 is small, (i.e. more power available) the circuit 420 of FIG. 4a is capable of greatly reducing the transaction time. For example, FIG. 5 shows a transaction time of 50 ms at a distance of 5 cm on curve 507 which describes the performance of the present invention as shown in FIG. 4a. Curve 509 gives a transaction time of 100 ms for the same 5 cm distance. Thus, as shown, the circuit 420 of FIG. 4a outperforms the prior art solution. At distances of greater than 10 cm, when the prior art solution is non-functional (see FIG. 3), the integrated circuit 420 of FIG. 4a continues to operate within the limits of the transmitter and/or receiver, if applicable, with longer transaction times.

Figure 6:
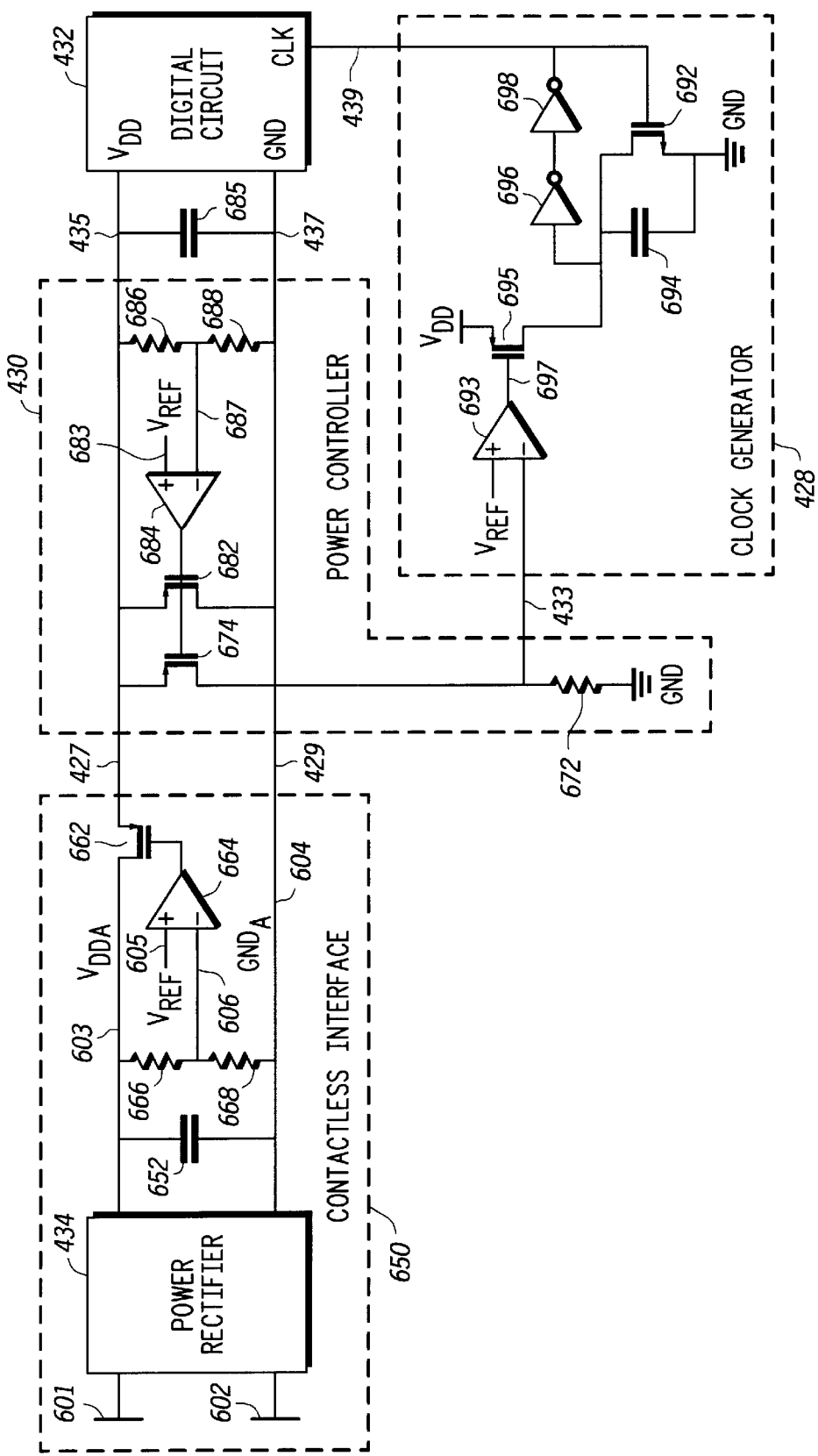
FIG. 6 illustrates a detailed block diagram of FIG. 4a in accordance with the preferred embodiment of the preset invention.

FIG. 6 illustrates a detailed block diagram of FIG. 4a in accordance with the preferred embodiment of the present invention. A contactless interface 650 (shown as capacitive interface in FIG. 6) receives power from the RF field via electrodes 601 and 602. The power rectifier 434 performs a rectification of the received RF signal. A bypass capacitor 652 filters off the high frequency content of the output of the power rectifier 434 producing a substantially DC signal. This DC signal is used to power the portable data device 400.

A shunt/series regulator located at the contactless interface 650 controls the magnitude of the DC signal out of the contactless interface 650. The shunt/series regulator comprises resistors 666 and 668, a differential amplifier 664, and an isolating current source transistor (e.g., PFET, NFET, etc.) 662. The shunt/series regulator presents a shunt power path to the contactless interface 650, but also provides series isolation between the digital power supply nodes $V_{DD}$ 435 and GND 437 and the contactless interface 650. The shunt/series regulator essentially fixes the DC level from $V_{DDA}$ 603 to $GND_A$ 604 to a predetermined value. In the preferred embodiment, that DC level is chosen to be 4.5 volts, however, this level can vary. The transistor 662 couples the power from $V_{DDA}$ 603 to the positive power supply node $V_{DD}$ 435 of the digital circuit 432. The gate of the transistor 662 is driven by the output of the differential amplifier 664. The positive input terminal 605 of the differential amplifier 664 is connected to a reference voltage, $V_{REF}$. In the preferred embodiment, the voltage level of the reference voltage is 2.25 volts. The negative input terminal 606 of the differential amplifier 664 is connected to the resistor divider comprised of resistors 666 and 668. Resistors 666 and 668 are designed to generate one-half of the applied voltage at the output of the divider. The resistor divider is connected between $V_{DDA}$ 603 and $GND_A$ 604.

Operation of the shunt/series regulator located on the contactless interface 650 can be demonstrated with three simple examples. If the value of the voltage on $V_{DDA}$ 603 is less than 4.5 volts, then the voltage at the negative input terminal 606 of the differential amplifier 664 will be less than 2.25 volts. If the voltage present at the negative input terminal 606 of the differential amplifier 664 is smaller than the voltage present at the positive input terminal 605 which is 2.25 volts, the voltage at the output of the differential amplifier 664 will increase. An increase in voltage at the output of the differential amplifier 664 will decrease the source-gate voltage of the transistor 662. The decrease in the source-gate voltage of the transistor 662 results in a decrease in the current flowing out of the drain of the transistor 662 into $V_{DD}$ 435 and out of $V_{DDA}$ 603. This increases the voltage of $V_{DDA}$ 603 until the voltage reaches 4.5 volts. If the value of the voltage on $V_{DDA}$ 603 is greater than 4.5 volts, then the voltage at the negative input terminal 606 of the differential amplifier 664 will be greater than 2.25 volts. If the voltage present at the negative input terminal 606 of the differential amplifier 664 is larger than the voltage present at the positive input terminal 605 which is 2.25 volts, the voltage at the output of the differential amplifier 664 will be decreased. A decrease in voltage at the output of the differential amplifier 664 will increase the source-gate voltage of the transistor 662. The increase in the source-gate voltage of the transistor 662 results in an increase in the current flowing out of the drain of the transistor 662 into the $V_{DD}$ 435 and out of $V_{DDA}$ 603. This decreases the voltage of $V_{DDA}$ 603 until it reaches 4.5 volts. If the value of the voltage on $V_{DDA}$ 603 is substantially equal to 4.5 volts, then the voltage at the negative input terminal 606 of the differential amplifier 664 will be equal to 2.25 volts. If the voltage present at the negative input terminal 606 of the differential amplifier 664 is equal to the voltage present at the positive input terminal 605 which is 2.25 volts, the voltage at the output of the differential amplifier 664 will remain constant. A constant voltage at the output of the differential amplifier 664 results in a constant source-gate voltage of the transistor 662. The constant source-gate voltage of transistor 662 results in a constant current flowing out of the drain of the transistor 662 into $V_{DD}$ 435 and out of $V_{DDA}$ 603. This constant current maintains a constant voltage at $V_{DDA}$ 603 of 4.5 volts. From these examples, it is easy to see that the shunt/series regulator will regulate the supply voltage from $V_{DDA}$ 603 to $GND_A$ 604 to 4.5 volts by adjusting the available current. All current supplied to the digital circuit 432 comes from the drain of the transistor 662.

Figure 7:
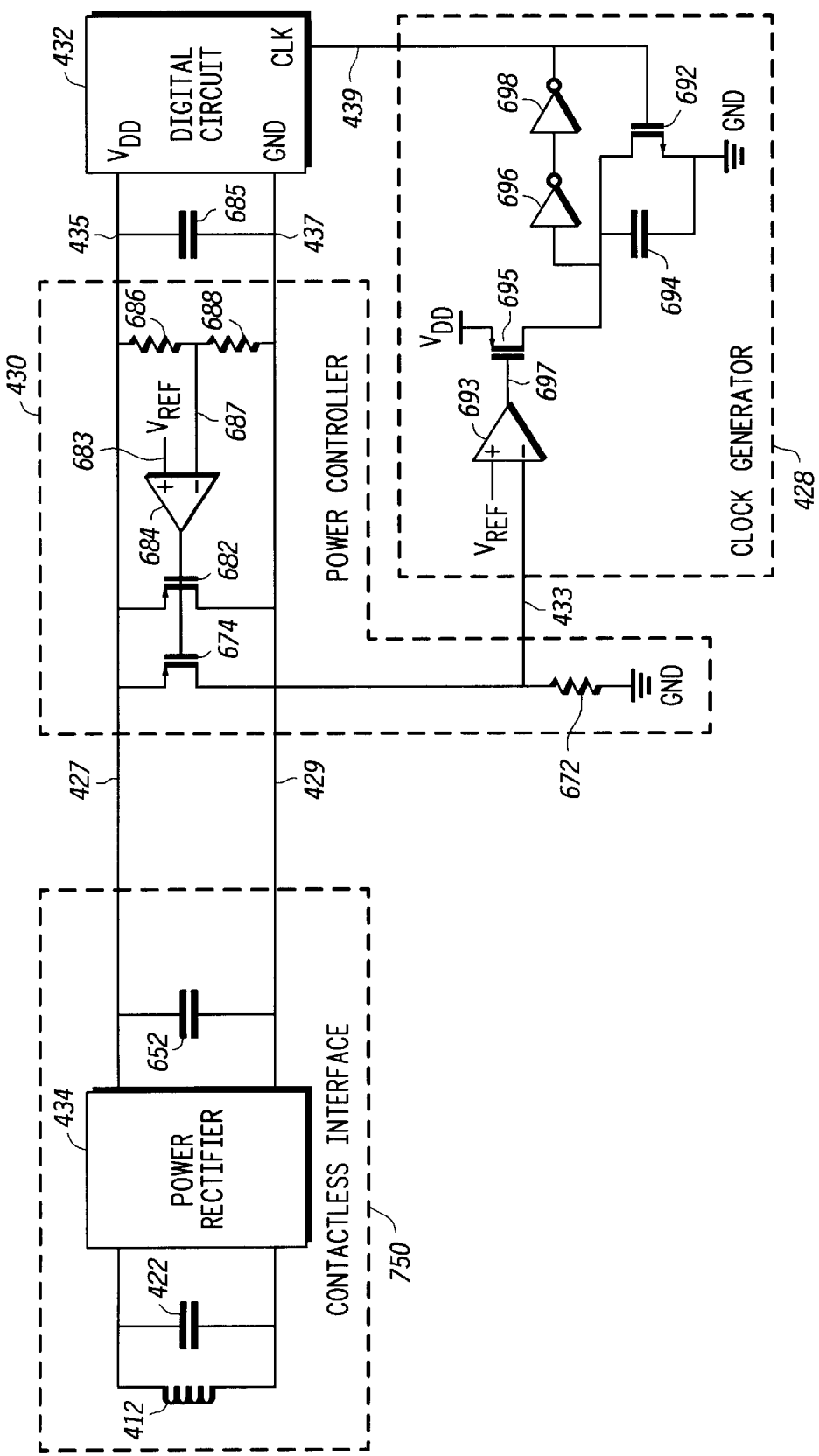
FIG. 7 illustrates a detailed block diagram of FIG. 4a in accordance with a first alternative embodiment of the present invention.

FIG. 7 illustrates a detailed block diagram of FIG. 4a in accordance with a first alternative embodiment of the present invention. FIG. 7 represents the application of the present invention to a commonly used alternative contactless smart card circuit. The circuit of FIG. 7 is equivalent to the circuit of FIG. 6 with the shunt/series regulator located at the contactless interface eliminated and an (inductive) contactless interface 750 replacing the (capacitive) contactless interface 650. The (inductive) contactless interface 750 receives power from the RF field via the inductive antenna 412. The tuning capacitor 422 in parallel with the inductive antenna 412 produces resonance at the RF carrier frequency. The power rectifier 434 performs a rectification of the received RF signal. The bypass capacitor 652 filters off the high frequency content of the output of the power rectifier 434 producing a substantially DC signal. This DC signal is used to power the portable data device 400.

As shown in FIGS. 6 and 7, voltage regulation is also required for the power supply nodes, $V_{DD}$ 435 and GND 437, of the digital circuit 432. The shunt regulator provides that function by setting the voltage level of the power supply for the digital circuit 432 by adjusting the available current. Five elements are used to construct the shunt regulator in accordance with the present invention: a current sink transistor 682, a differential amplifier 684, a resistor divider comprised of resistors 686 and 688, a bypass capacitor 685, and a reference voltage 683. The current sink transistor 682 couples the excess available power from $V_{DD}$ 435 to GND 437. The gate of the current sink transistor 682 is driven by the output of the differential amplifier 684. The positive input terminal 683 of the differential amplifier 684 is connected to a reference voltage, $V_{REF}$. In the present invention, the voltage level of the reference voltage is 2.25 volts. The negative input terminal 687 of the differential amplifier 684 is connected to the resistor divider 686, 688. Since the differential amplifier 684 has a finite bandwidth, the bypass capacitor 685 is included to provide a high frequency current path. The resistor divider 686, 688 is designed to provide a voltage of $X*V_{DD}$, where X is a value in the range of 0 to 1 inclusive. The shunt regulator will create a supply voltage for the digital circuit 432 equal to $V_{REF}/X$. In the present invention, X is chosen to be ¾. This results in a power supply voltage of 2.25*⁴⁄₃=3 volts.

Operation of the shunt regulator located in the power controller 430 can be demonstrated with three simple examples. If the value of the voltage on $V_{DD}$ 435 is less than 3 volts, then the voltage at negative input terminal 687 of the differential amplifier 684 will be less than 2.25 volts. If the voltage present at the negative input terminal 687 of the differential amplifier 684 is smaller than the voltage present at the positive input terminal 683, which is 2.25 volts, the voltage at the output of the differential amplifier 684 will be increased. An increase in voltage at the output of the differential amplifier 684 will decrease the source-gate voltage of the current sink transistor 682. This decrease in the source-gate voltage of the current sink transistor 682 results in a decrease in the current flowing out of the drain of the current sink transistor 682 into GND 437. This increases the voltage of $V_{DD}$ 435 until it reaches 3 volts. If the value of the voltage on $V_{DD}$ 435 is greater than 3 volts, then the voltage at the negative input terminal 687 of the differential amplifier 684 will be greater than 2.25 volts. If the voltage present at the negative input terminal 687 of the differential amplifier 684 is larger than the voltage present at the positive input terminal 683, which is 2.25 volts, the voltage at the output of the differential amplifier 684 will be decreased. A decrease in voltage at the output of the differential amplifier 684 will increase the source-gate voltage of the current sink transistor 682. The increase in the source-gate voltage of the current sink transistor 682 results in an increase in the current flowing out of the drain of the current sink transistor 682 into GND 437. This decreases the voltage of $V_{DD}$ 435 until it reaches 3 volts. If the value of the voltage on $V_{DD}$ 435 is substantially equal to 3 volts, then the voltage at the negative input terminal 687 of the differential amplifier 684 will be equal to 2.25 volts. If the voltage present at the negative input terminal 687 of the differential amplifier 684 is equal to the voltage present at the positive input terminal 683, which is 2.25 volts, the voltage at the output of the differential amplifier 684 will remain constant. A constant voltage at the output of the differential amplifier 684 results in a constant source-gate voltage of current sink transistor 682. The constant source-gate voltage of the current sink transistor 682 results in a constant current flowing out of the drain of the current sink transistor 682 into GND 437. This constant current maintains a constant voltage at $V_{DD}$ 435 of 3 volts. From these examples, it is easy to see that the shunt regulator will regulate the supply voltage from $V_{DD}$ 435 to GND 437 to 3 volts by adjusting the available current. The current through the current sink transistor 682 is the excess or unused current.

It is commonly known in the art of CMOS analog circuit design that taking an equivalent metal oxide semiconductor field effect transistor ("MOSFET") and connecting the sources and the gates of the two devices can create a replica of the current through a MOSFET. Likewise, taking an equivalent MOSFET with a scaled device width and connecting the sources and the gates of the two devices can create a scaled replica of the current through a MOSFET. This is commonly referred to as a current mirror. A received signal strength indicator ("RSSI") circuit is comprised of a transistor (e.g., RSSI p-channel MOSFET) 674 with a source that is common with the source of the current sink transistor 682. The gate of the transistor 674 is also common with the gate of the current sink transistor 682. In the present invention, the device length of the transistor 674 and the current sink transistor 682 are equal, but the width of the transistor 674 is ⅑ of the width of the current sink transistor 682. Thus, the drain current of the transistor 674 is ⅑ of the drain current of the current sink transistor 682. The drain of the transistor 674 is connected to a 225 k-ohm resistor 672. The voltage across resistor 672 provides a direct measure of the excess current that is available, but not being used by the digital circuit 432.

The clock generator 428 contains a 3-stage ring oscillator. One stage of the ring is loaded by capacitor 694 and has a current source pull-up 695. The gate node 697 controls the magnitude of the current of current source pull-up 695. The pull-down device 692 for the capacitively loaded oscillator stage is connected as part of the ring. The two remaining stages are built as simple CMOS inverters 696 and 698. The value of the current in the current source pull-up 695, the size of capacitor 694 and the threshold of CMOS inverter 696 substantially determine the frequency of the clock generator 428. Alternatively, a voltage comparator could be used in place of CMOS inverter 696 to improve frequency accuracy. Since clock generator 428 will be used in a feedback loop, frequency accuracy is not required, so a comparator is not necessary. The gate node 697 is oriented such that a reduced voltage at the gate node 697 increases the frequency of the clock signal 439. A larger voltage at the gate node 697 decreases the frequency of the clock signal 439.

The differential amplifier 693 is used to drive the gate node 697 of the current source pull-up 695. The positive input of the differential amplifier 693 is connected to $V_{REF}$, which is equal to 2.25 volts in the present invention. The negative input of the differential amplifier 693 is connected to the RSSI output 433, which represents the excess available current. If the voltage of the RSSI output 433 is less than $V_{REF}$, then the output of the differential amplifier 693 will increase. The output of the differential amplifier 693 is connected to the gate node 697. An increased voltage at the gate node 697 reduces the frequency of the clock signal 439. A decrease in the frequency of the clock signal 439 for the digital circuit 432 will decrease the current drain of the digital circuit 432 causing an increase in the excess current. If the voltage of the RSSI output 433 is greater than $V_{REF}$, then the output of the differential amplifier 693 will decrease. The output of the differential amplifier 693 is connected to the gate node 697. A decreased voltage at the gate node 697 increases the frequency of the clock signal 439. An increase in the frequency of the clock signal 439 for the digital circuit 432 will increase the current drain of the digital circuit 432 causing a decrease in the excess current. The clock generator 428, the power controller 430 and the digital circuit 432 comprise a feedback loop. The loop will regulate the excess current to 90 microamps. This value was chosen to provide a safety margin in the event of a reduction in the available power. If the regulated value of excess current drops to zero, then the power supply to the digital circuits may fail.

Figure 8:
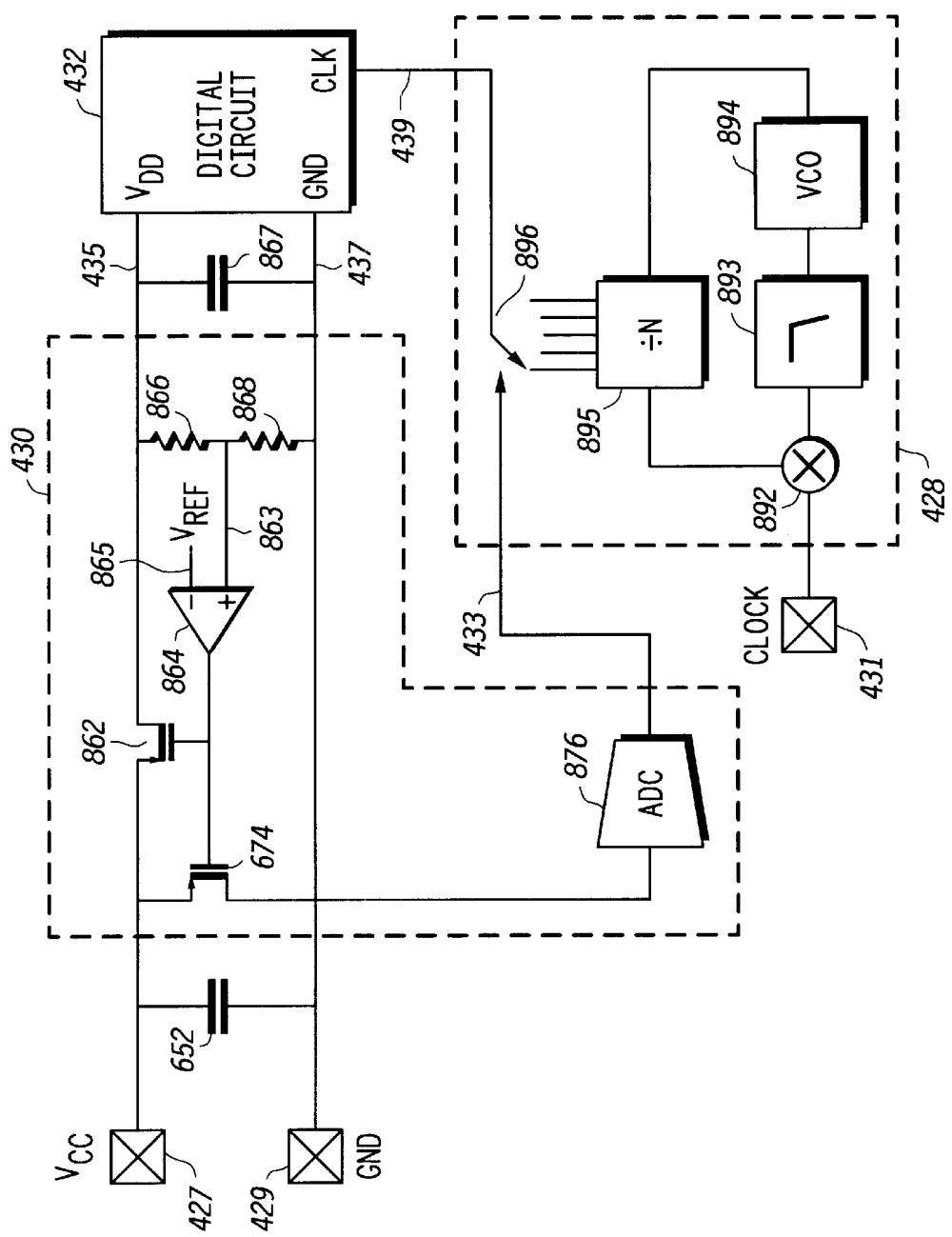
FIG. 8 illustrates a detailed block diagram of FIG. 4a in accordance with a second alternative embodiment of the present invention.

FIG. 8 illustrates a detailed block diagram of FIG. 4a in accordance with a second alternative embodiment of the present invention. The input power ports are labeled $V_{CC}$ 427 and GND 429. These could be the power connections provided on a contacted smart card or they could be the power port outputs of a rectifier in a contactless (RF powered) smart card. For this discussion, a contacted smart card interface is assumed. The ISO-7816 specification for contacted smart cards specifies the power signal characteristics to be applied at $V_{CC}$ 427 and GND 429. Specifically, a supply voltage of 5 volts is specified. Modem CMOS IC processes do not support 5-volt operation. The thin gate oxide of ICs fabricated in deep sub-micron technologies will physically fail if powered with a 5-volt power supply. Therefore, some conditioning of the power supply is required. In the second alternative embodiment, a series regulator is used to create the supply voltage for the digital circuit 432. The series regulator sets tile voltage level of the power supply for the digital circuit 432 by adjusting the available current. Five elements are used to construct the series regulator for use with the present invention, however, substitute elements may be used: a current source transistor 862, a differential amplifier 864, a resistor divider comprised of resistors 866 and 868, a bypass capacitor 867, and a reference voltage. The current source transistor 862 couples the power from input power port $V_{CC}$ 427 to positive power supply node $V_{DD}$ 435 of the digital circuit 432. The gate of the current source transistor 862 is driven by the output of the differential amplifier 864. The negative input terminal of the differential amplifier 864 is connected to the reference voltage, $V_{REF}$ 865. In the second alternative embodiment, the voltage level of the reference voltage is 2.25 volts. The positive input terminal of the differential amplifier is connected to resistors 866 and 868. Since the differential amplifier 864 has a finite bandwidth, the bypass capacitor 867 is included to provide a high frequency current path. Resistors 866 and 868 are designed to provide a voltage of $X*V_{DD}$, where X is a value in the range of 0 to 1 inclusive. The series regulator will create a supply voltage for the digital circuit 432 equal to $V_{REF}/X$. In the second alternative embodiment, X is chosen to be ¾. This results in a power supply voltage of 2.25*4/3=3 volts.

Operation of the series regulator located at the power controller 430 can be demonstrated with three simple examples. If the value of the voltage on $V_{DD}$ 435 is less than 3 volts, then the voltage at the positive input terminal 863 of the differential amplifier 864 will be less than 2.25 volts. If the voltage present at the positive input terminal 863 of the differential amplifier 864 is smaller than the voltage present at the negative input terminal 865, which is 2.25 volts, the voltage at the output of the differential amplifier 864 will be reduced. A reduction in voltage at the output of the differential amplifier 864 will increase the source-gate voltage of the current source transistor 862. The increase in the source-gate voltage of the current source transistor 862 results in an increase in the current flowing out of the drain of the current source transistor 862 into $V_{DD}$ 435. This increases the voltage of $V_{DD}$ 435 until it reaches 3 volts. If the value of the voltage on $V_{DD}$ 435 is greater than 3 volts, then the voltage at the positive input terminal 863 of the differential amplifier 864 will be greater than 2.25 volts. If a the voltage present at the positive input terminal 863 of the differential amplifier 864 is larger than the voltage present at the negative input terminal 865, which is 2.25 volts, the voltage at the output of the differential amplifier 864 will be increased. An increase in voltage at the output of the differential amplifier 864 will decrease the source-gate voltage of the current source transistor 862. The decrease in the source-gate voltage of the current source transistor 862 results in a decrease in the current flowing out of the drain of the current source transistor 862 into $V_{DD}$ 435. This decreases the voltage of $V_{DD}$ 435 until it reaches 3 volts. If the value of the voltage on $V_{DD}$ 435 is substantially equal to 3 volts, then the voltage at the positive input terminal 863 of the differential amplifier 864 will be equal to 2.25 volts. If the voltage present at the positive input terminal 863 of the differential amplifier 864 is equal to the voltage present at the negative input terminal 865, which is 2.25 volts, the voltage at the output of the differential amplifier 864 will remain constant. A constant voltage at the output of the differential amplifier 864 results in a constant source-gate voltage of the current source transistor 862. The constant source-gate voltage of the current source transistor 862 results in a constant current flowing out of the drain of the current source transistor 862 into the $V_{DD}$ 435. This constant current maintains a constant voltage at $V_{DD}$ 435 of 3 volts. From these examples, it is easy to see that the series regulator will regulate the supply voltage from $V_{DD}$ 435 to GND 437 to 3 volts by adjusting the available current. All current supplied to the digital circuit 432 comes from the drain of the current source transistor 862.

Power controller 430 includes a RSSI circuit comprised of a transistor (e.g., a RSSI p-channel MOSFET) 674 with a source that is common with the source of current source transistor 862. The gate of the transistor 674 is also common with the gate of current source transistor 862. In the second alternative embodiment, the device length of the transistor 674 and current source transistor 862 are equal, but the width of the transistor 674 is ¹⁄₁₀₀ of the width of current source transistor 862. Thus, the drain current of the transistor 674 is ¹⁄₁₀₀ of the drain current of the current source transistor 862. The drain current of the transistor 674 is the output signal of the RSSI circuit. The drain current provides a direct measure of the current being used by the digital circuit 432.

The output of the RSSI circuit is connected to the input of analog-to-digital converter ("ADC") 876. The ADC 876 converts the value of the RSSI output into a digital representation of the current being used by the digital circuit 432. This digital representation of the current being used by the digital circuit 432 is output on the node 433.

The clock generator 428 is comprised of a phase lock loop ("PLL") and a clock selection circuit 896. The PLL is used to generate a multitude of possible clock frequencies. The clock input 431 of the contacted smart card interface is used as a frequency reference. A phase detector 892, a low-pass filter 893, a voltage-controlled oscillator ("VCO") 894, and a frequency divider 895 are connected in a feedback loop configuration. This configuration is commonly known to those practiced in the art of PLLs. The gain of the loop and the negative feedback force the output frequency to be an integer multiple of the reference frequency available at the clock input 431. The value of the integer multiple is set by the integer divide ratio of the frequency divider 895. In the second alternative embodiment, the reference frequency available at the clock input 431 is 7.8 MHz. A fixed divide ratio of 4 is used in the frequency divider. Thus, the frequency available at the output of the VCO 894 is 31.2 MHz. The frequency divider 895 has five outputs. The five outputs correspond to the frequency output of the VCO 894 and the frequency of the VCO 894 divided by 2, 4, 8 and 16. These five signals are available for use as clocks for the digital circuit 432.

Clock selection circuit 896 has five clock inputs corresponding to the five clock outputs of frequency divider 895. A sixth input is the RSSI signal 433. The RSSI input 433 controls the selection of the appropriate clock for the digital circuit 432. If the value of the RSSI signal available at RSSI input 433 is less than half of the specified available current, the clock selection circuit 896 doubles the clock frequency for the digital circuit 432 by selecting the next higher available frequency.

Doubling the clock frequency for the digital circuit 432 will increase the current drain of the digital circuit 432 by a factor of approximately 2. The series regulator will react by increasing the current through current source transistor 862 to maintain the required supply voltage. This current change will be reflected in the RSSI signal 433. This new value for RSSI input 433 will be used to once again adjust the clock frequency, if necessary. The process continues ad infinitum. The use of a low frequency strobe signal for the ADC 876 prevents loop oscillation.

Figure 9:
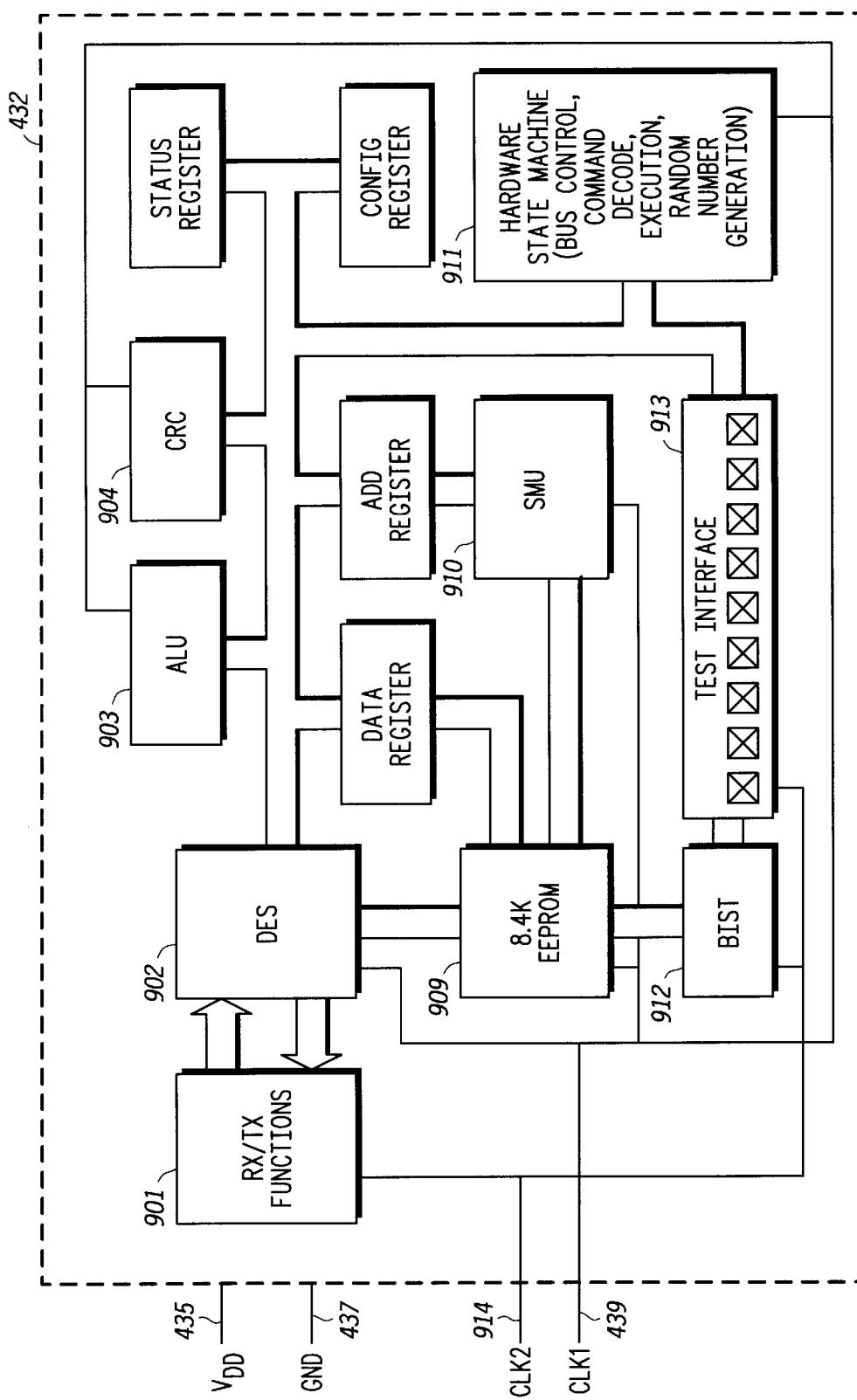
FIG. 9 illustrates a block diagram of the digital functions of a smart card.

FIG. 9 shows a block diagram of a possible realization for the digital circuit 432. In this realization, some of the digital components provide basic signal processing or data manipulation. These components include a data encryption standard ("DES") engine 902, an arithmetic logic unit ("ALU") 903, a cyclic redundancy check ("CRC") 904, a hardware state machine 911, and a secure memory unit ("SMU") 910. Signal 439 is the clock signal for each of these components. Each of these components is a strong candidate for power dependent clock signals. The receiver/transmitter component 901, the built-in self test ("BIST") component 912, and the test interface component 913, however, are driven by a second clock signal 914. These three components are real-time components. These components are required to interface with other systems. As a result, they must adhere to strict timing standards. For example, receiver/transmitter 901, when implemented in an ISO-14443 compliant smart card, must receive and transmit signals at precisely 105.9 kilobits per second. Therefore, it must have a 105.9 kHz clock reference available. Data reception and transmission may not vary in frequency or rate. Likewise, the BIST component 912 and the test interface component 913 must interface with an external IC tester. The IC tester sets the timing of the input signal and expects response signals to occur at predetermined points in time. Any deviation in timing will be perceived as an error. ICs that do not pass completely are scrapped. Thus, it can be appreciated that within a single IC, a combination of fixed and power dependent clock signals may be desirable.

Figure 10:
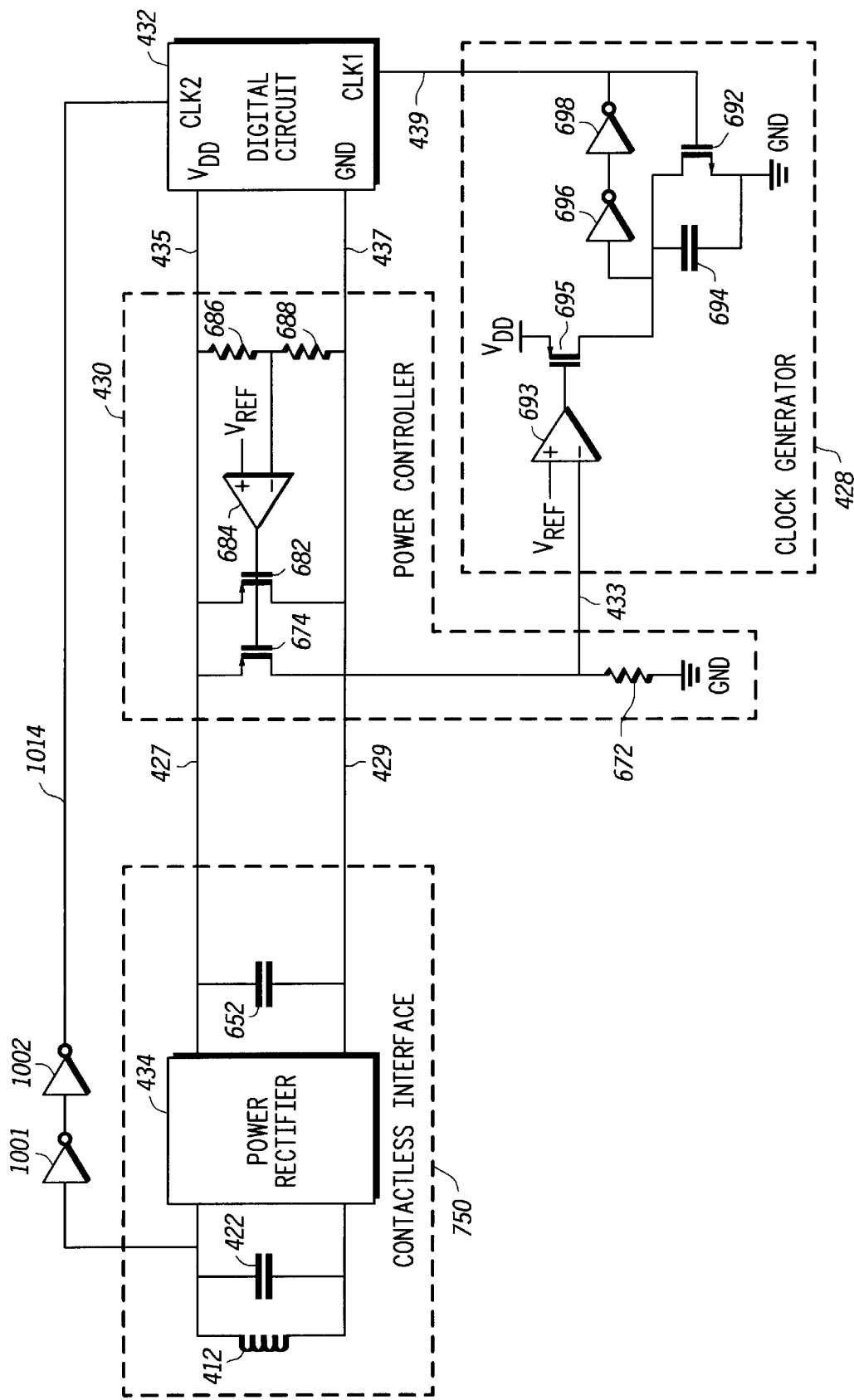
FIG. 10 illustrates a detailed block diagram of FIG. 4a having a real time clock in accordance with the present invention.

FIG. 10 shows an embodiment of the invention that includes both fixed and variable clocks. The circuit illustrated in FIG. 10 is equivalent to the circuit illustrated in FIG. 7 with the addition of a fixed frequency clock signal 1014. The contactless interface 750 receives power from the RF field via the inductive antenna 412. The tuning capacitor 422 in parallel with the inductive antenna 412 produces resonance at the RF carrier frequency. The power rectifier 434 performs a rectification of the received RF signal. The bypass capacitor 652 filters off the high frequency content of the output of the power rectifier 434 producing a substantially DC signal. This DC signal is used to power the portable data device 400. The functionality of the clock generator 428 and the power controller 430 of FIG. 10 are preferably the same as described above with reference to FIGS. 6 and 7.

Buffering the AC signal received across the inductor 412 provides the fixed frequency clock signal 1014. Inverters 1001 and 1002 buffer the signal and also translate the signal levels to the desired amplitude. Since the fixed clock signal 1014 and the variable clock signal 439 are available to the digital circuit 432, the digital circuit 432 of FIG. 10 is capable of taking advantage of the present invention without disrupting the required functionality of any real time operating components contained within.

While the invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A portable data device efficiently utilizing its available power, the portable data device comprising:
a power monitor having an output signal, the output signal being representative of available power;
a clock generator coupled to the output signal of the power monitor for generating a clock rate as a function of the output signal; and
a circuit coupled to the clock generator wherein the circuit is controlled by the clock rate.

2. The portable data device of claim 1 wherein the clock generator is selected from a group consisting of: a phase lock loop, a voltage controlled oscillator, and a current controlled oscillator.

3. The portable device of claim 1 wherein the power monitor monitors an electromagnetic field.

4. The portable device of claim 1 wherein the power monitor monitors an electrostatic field.

5. The portable device of claim 1 wherein the power monitor monitors an electric field.

6. The portable device of claim 1 wherein the power monitor monitors a battery power of the portable data device.

7. The portable data device of claim 1 wherein the portable data device is selected from a group consisting of: a smart card, a radio frequency identification device, a personal digital assistant, a web browser, a computer, and an internet enabled cellular telephone.

8. The portable data device of claim 1 further comprising a clock, coupled to the circuit, having a fixed clock rate.

9. The portable data device of claim 1 wherein the circuit is a digital circuit.

10. A method of efficiently utilizing available power in a portable data device, the method comprising the steps of:
monitoring an available power received at the portable data device; and
adjusting a clock frequency within the portable data device based on the step of monitoring.

11. The method of claim 10 wherein the step of adjusting the clock frequency is a continuous function of the available power received by the portable data device.

12. The method of claim 10 wherein the step of adjusting the clock frequency is adjusted in fixed discrete steps.

13. The method of claim 10 wherein the step of monitoring an available power comprises the step of measuring an available current.

14. The method of claim 10 wherein the step of monitoring an available power comprises the step of measuring an available voltage.

15. The method of claim 10 wherein the step of monitoring an available power comprises the step of measuring an available battery strength.

16. The method of claim 10 further comprising the step of providing a fixed clock rate for performing real time operations for the portable data device.

17. A method of efficiently utilizing available power in a portable data device, the method comprising the steps of:
monitoring an available power received by the portable data device;
determining the amount of power being used by the portable data device; and
adjusting a clock frequency within the portable data device based on a difference between the available power received by the portable data device and the amount of power being used by the portable data device.

18. The portable data device of claim 1 wherein the power monitor comprises a received signal strength indicator circuit.

19. The portable data device of claim 1 further comprising a power controller coupled to the power monitor and the circuit.

\* \* \* \* \*